United States Patent [19]
Stark et al.

[11] 4,156,122
[45] May 22, 1979

[54] ELECTROSLAG WELDING

[75] Inventors: Louis E. Stark, Youngstown; Marvin A. Brahler, Louisville, both of Ohio

[73] Assignee: The Babcock & Wilcox Company, New York, N.Y.

[21] Appl. No.: 822,961

[22] Filed: Aug. 8, 1977

Related U.S. Application Data

[62] Division of Ser. No. 491,447, Jul. 24, 1974, abandoned.

[51] Int. Cl.² .............................................. B23K 25/00
[52] U.S. Cl. .................................... 219/73.1; 219/73; 219/145.41
[58] Field of Search .............. 219/73 A, 73 R, 145.41, 219/73.1

[56] References Cited

U.S. PATENT DOCUMENTS

| | | | |
|---|---|---|---|
| 3,042,790 | 7/1962 | Johnson | 219/73 R |
| 3,518,397 | 6/1970 | Hannahs | 219/73.1 |
| 3,558,845 | 1/1971 | Norcross | 219/73.1 |
| 3,602,688 | 8/1971 | Sibley | 219/73.1 X |
| 3,625,757 | 12/1971 | Wiehe | 219/73.1 X |
| 3,646,312 | 2/1972 | Cable | 219/73 R |
| 3,825,716 | 7/1974 | Kokura | 219/73.1 |
| 4,045,648 | 8/1977 | Iio et al. | 219/73 R |

FOREIGN PATENT DOCUMENTS 1356761  6/1974  United Kingdom ................. 219/73 A

*Primary Examiner*—Richard R. Kucia
*Attorney, Agent, or Firm*—J. M. Maguire; R. C. Mai

[57] ABSTRACT

A method of electroslag welding using a blanket of fiberized siliceous material on a stationary consumable guide in a narrow gap welding process.

2 Claims, 5 Drawing Figures

ELECTROSLAG WELDING

This application is a division of U.S. patent application Ser. No. 491,447, now abandoned, filed on July 24, 1974.

BACKGROUND OF THE INVENTION

1. Field of the Invention

This invention relates to an improved method of electroslag welding involving the use of a fiberized flux in blanket form.

2. Description of the Prior Art

Electroslag welding is well known. In general, when weld-joining plates or bars, the work piece is horizontally arranged with the vertical edge surfaces of the plates substantially uniformly spaced and fixed in spaced relationship by a metallic strip or bar spanning the bottom of the cavity formed between the vertical edge surfaces of the plates to be weldably joined. The bottom strip is not only utilized to permit starting the welding procedure, but also serves to restrain or restrict heat distortion of the joint during the welding procedure. Sometimes the bottom strip may be supplemented by reinforcing bars forming a "strong back" to further resist heat distortion. The ends of the cavity are closed by water-cooled copper dams or shoes to avoid loss of molten weld metal and slag during the welding procedure.

In electroslag welding the welding head usually includes a consumable guide member of generally rectangular horizontal cross section and is provided with one or more slots or apertures which serve to permit downward movement of electrode or filler wires therethrough, through which electric power is supplied for the welding procedure. In general, the guide member substantially extends the full length of the cavity to be filled with weld metal and is dimensioned to provided a gap between the exterior longitudinal walls thereof and the adjacent vertical edges of the plates to be weld joined. Under such dimensional circumstances, the guide is substantially stationary insofar as transverse movements are concerned. Under some circumstances, however, the guide member is of the non-consumable type where it becomes necessary to change the vertical relationship of the guide member relative to the weld cavity. The more common procedure is to utilize consumable guide members where the member is generally fixed in a vertical direction insofar as the weld cavity is concerned.

In the procedure heretofore in use, it has been customary to provide granular flux or slagging material through the gap between the edge of the guide member and the vertical member of the plate to be welded. To start the welding procedure, it has also been customary to insert a starter material, such as steel wool, directly under the electrode wires and extending through the granular flux so that the initial flow of electric current can occur through the steel wool. Once the welding procedure has been started, the flux or slag material which is substantially non-conductive in its cold granular form is melted by passage of the current through the steel wool. With the arc initially established, the granular slag melts and becomes relatively electrically conductive and forms a molten pool which covers the surfaces of the work piece being welded. As the procedure continues, the molten flux provides a protective layer on the top of the molten weld metal to avoid oxidation and harmful slag inclusions in the weld so formed.

In the procedure heretofore in use, an enlarged gap between the guide and the work piece surfaces prevented short circuiting, by physical contact or arcing, of the welding process. It is obvious that an enlarged cavity would not only prevent short circuiting, but also would provide easy access to the slag pool to which additional flux may be supplied as needed. The increased volume of the cavity, however, increases the amount of filler material to be deposited, increases the amount of flux material to produce the necessary slag pool and also causes excessive heating produced by the additional filler material resulting in degradation of the mechanical properties of the weld zone in many of the low alloy and high strength steels. Therefore, it is desirable to separate the surfaces of the work pieces by a narrow gap having an insulating material situated between the guide and the work pieces. Filling a narrow gap with typical granular flux is generally inadequate with respect to the necessary electrical insulation, since the granular flux has a tendency to surge into the slag pool leaving an inadequate narrow air space for electrical insulation purposes.

Electrically insulating material, such as ceramic refractory fibers and glass wool disposed within the gap with the granular flux have been suggested as a means of correcting the loss of granular flux insulation. In general, however, these materials have been found to adversely influence the weld properties.

SUMMARY OF THE INVENTION

In accordance with the invention, it has been found that fluxes heretofore in use in electroslag welding can advantageously be fiberized and collected in a partially compressed generally unitary state or in a more convenient blanket form for insertion between the defining surfaces of the welding cavity and the consumable guide. This layer of fiberized flux not only provides electrical insulation between the guide and the walls of the cavity, but also provides a source of flux for the welding process. For example, fiberized flux blankets of $\frac{1}{2}$ inch thickness and a weight of 0.4 to 1.6 pounds per square foot have been successfully utilized in electroslag welding, where the blankets were compressed upon installation to a $\frac{1}{8}$ of an inch thickness.

We have found that all fluxes commonly used for electroslag welding cannot be satisfactorily fiberized. Adequate fiberization can be accomplished with fluxes having a relatively substantial silica ($SiO_2$) content. The invented fiberized flux may be conveniently produced through a process in which a siliceous mineral flux having a substantial silica ($SiO_2$) content is heated until a substantially uniform liquid is formed. Subsequently, the liquid flux is poured in a manner producing a normally uniform stream of liquid flux which is intersected by a "jet" stream, such as that produced by gas or air discharged through a nozzle in a pressurized line. The "jet" stream shreds the liquid flux into fibers of various length and deposits them on a collecting screen, from which, the collected bulk fibers may be compressed to blanket form.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a prefered embodiment of the invention.

DETAILED DESCRIPTION OF THE PREFERRED EMBODIMENTS

Figure 1:
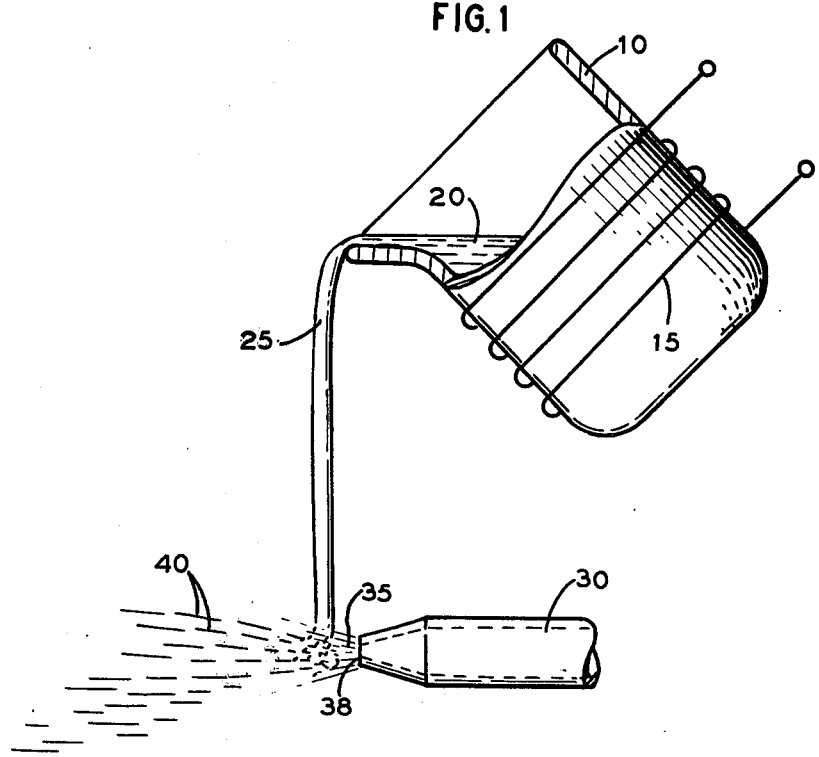
FIG. 1 is a schematic process diagram illustrating one method of producing the fiberized flux of the present invention.
Figure 2:
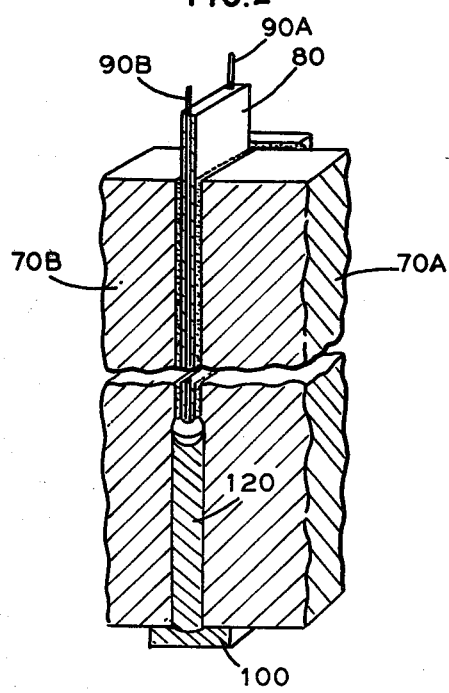
FIG. 2 is a fragmentary sectional view in perspective of the welding process of this invention.

For a more complete appreciation of the invention, attention is invited to FIG. 1 and the following description of an illustrative method of producing the fiberized flux of the present invention. Typically, electroslag welding flux having a substantial silica content is disposed in a container such as crucible 10, and heated by suitable means, for example, the induction coil 15, to a substantially uniform liquid state 20. Subsequently, the liquid flux is poured in a manner producing a normally uniform thin stream of liquid flux 25. Lip pouring, as shown in FIG. 1, is one means of producing a suitable thin liquid flux stream. Located below the crucible 10 is a pressurized line or blow pipe 30 disposed such that a "jet" stream of gas or air 35 issuing out of the nozzle 38 intersects the liquid flux stream 25. The "jet" stream shreds the liquid flux 25 into flux fibers 40 or various lengths and deposits them on a collecting screen (not shown). The collected bulk fibers (not shown) may be conveniently compressed to form blankets of fiberized flux (not shown) at nominal densities.

The following table of five typical electroslag welding fluxes indicates that adequate fiberization may be accomplished with fluxes having a relatively substantial silica ($SiO_2$) content.

TABLE I

| Sample Flux No. | Major Composition | Approximate Percent Of Total Composition | Satisfactorily Fiberized |
|---|---|---|---|
| 1. | $SiO_2$ | 40 | |
| | CaO | 25 | |
| | $Al_2O_3$ | 13 | Yes |
| | MgO | 8 | |
| | $CaF_2$ | 7 | |
| | $MnO_2$ | 7 | |
| 2. | $SiO_2$ | >25 | |
| | $MnO_2$ | >25 | |
| | $Al_2O_3$ | 14 | Yes |
| | CaO | 10 | |
| | $CaF_2$ | 10 | |
| | MgO | 7 | |
| 3. | $SiO_2$ | 18 | |
| | $CaF_2$ | 65 | |
| | CaO | 5 | |
| | $TiO_2$ | 3 | No |
| | $Al_2O_3$ | 3 | |
| | $Fe_2O_3$ | 3 | |
| | $MnO_2$ | 2 | |
| | MgO | 1 | |
| 4. | $CaF_2$ | 70 | |
| | CaO | 15 | No |
| | $Al_2O_3$ | 15 | |
| 5. | $Al_2O_3$ | 46 | |

TABLE I-continued

| Sample Flux No. | Major Composition | Approximate Percent Of Total Composition | Satisfactorily Fiberized |
|---|---|---|---|
| | CaO | 36 | No |
| | $CaF_2$ | 12 | |
| | MgO | 6 | |

Figure 3:
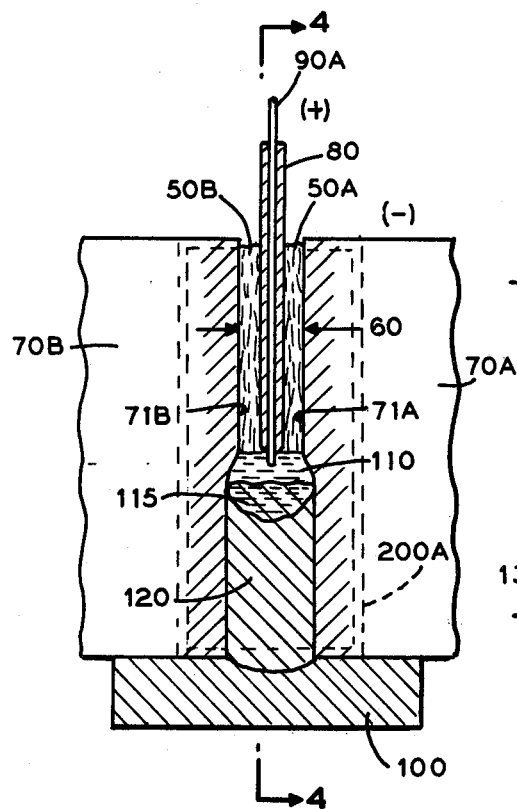
FIG. 3 is a schematic of the section along line 3—3 in FIG. 4.

The instant invention also provides a new electroslag welding process to essentially overcome some of the difficulties discussed above. FIGS. 2, 3 and 4 and 5 show one example of this new welding process, in section, sometime after initiation of the electrical power. Blankets of fiberized welding flux 50A and 50B FIG. 3 are disposed within the welding cavity 60 formed by the work pieces 70A and 70B and substantially fill the space between the guide plate 80, disposed within the cavity, and the work piece surfaces 71A and 71B. Although, in this example a consumable guide plate is shown, it is apparent to those skilled in the art that a movable guide plate may be substituted for the guide plate shown. The fiberized flux blankets 50A and 50B substantially equally space and also electrically insulate the guide plate 80 from the work piece 70A and 70B.

In general, the guide plate 80 is disposed within the cavity 60 is displaced about ¼ inch above the bottom of the cavity 60 in which space a starting material (not shown), typically steel wool, is arranged between the electrodes 90 and a starting plate 100. The electrodes 90A and 90B (FIG. 4) extend from the power source not shown through the guide plate during the welding process to provide filler material.

A procedure which may be used to place the fiberized flux and the guide plate within the cavity involves positioning one work piece surface in a substantially horizontal plane. In this position, a fiberized flux blanket may be readily placed upon the horizontal surface, followed by the guide plate and starting material and the other blanket of fiberized flux. The second work piece surface is then placed on the last blanket of flux and positioned at the required cavity width. Typically, with a ¼ inch thick guide plate the cavity width is about ½ to ¾ of an inch. Therefore, the typical blanket width of ½ of an inch is compressed within the cavity of ⅛ of ¼ of an inch. Thereafter, the work pieces are arranged in a position for electroslag welding.

Figure 4:
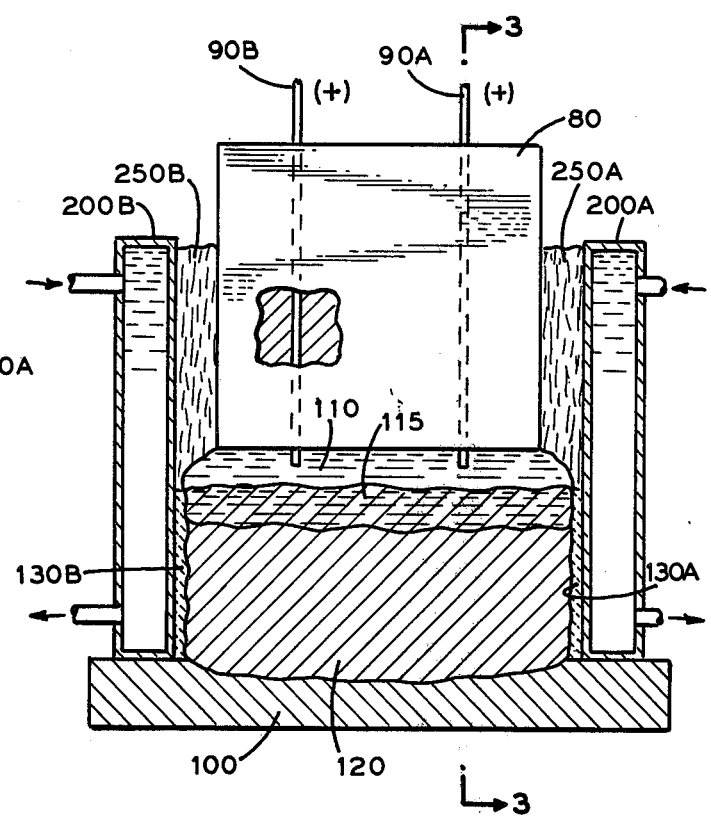
FIG. 4 is a schematic of the section along line 4—4 in FIG. 3.

As the power is supplied to the electrodes, the starting material (not shown), the flux blankets 50A and 50B, the electrodes 90A and 90B, the consumable guide plate 80, and the work piece surfaces 71A and 71B all melt into a slag pool 110, FIGS. 3 and 4. The heavier weld metal 115 settles in the slag pool and upon cooling forms the weld 120. The lighter slag solidifies along the outer edge of the cavity as a fused flux 130A and 130B. In general, cooling dams or water cooled shoes 200A and 200B, FIGS. 4 and 5, prevent the slag pool from spilling out of the cavity 60.

Figure 5:
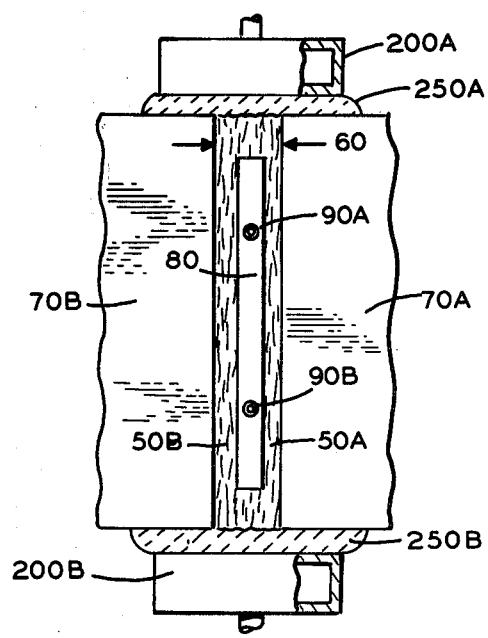
FIG. 5 is a plan view of FIG. 3.

The instant invention also provides a new welding process wherein fiberized refractory fiber material 250A and 250B, FIGS. 4 and 5, is positioned between the cooling shoes 200A and 200B and the work pieces 70A and 70B and extends across the welding cavity. The fiberized refractory is pressed against the work pieces by the cooling shoes substantially sealing the cavity 60.

The embodiments of the invention in which an exclusive property or privilege is claimed are defined as follows:

1. A method of electroslag, narrow gap welding of metallic work pieces comprising the steps of aligning the work pieces in spaced relation upon a starting plate, inserting a starting material on the starting plate between the work pieces, positioning a consumable, stationary guide plate having a filler wire electrode extending therethrough between the work pieces, positioning a fiberized flux in blanket form and having silica content greater than 25% by weight between the work pieces and the guide plate, to provide a contacting relationship between the guide plate and the fiberized flux blankets and the work pieces, compressing the blankets between the work pieces and the guide plate, feeding the filler wire electrode through the guide plate, the energizing the wire electrode from an electrical power supply.

2. A method of electroslag welding work pieces according to claim 1 further comprising a cooling shoe disposed in a vertical orientation along the work pieces and across the space between the work pieces, and having a ceramic refractory fiber material disposed between the cooling shoe and the work pieces to substantially seal the spaced work pieces during welding.

* * * * *